United States Patent [19]

Vanderheyden

[11] 4,158,436
[45] Jun. 19, 1979

[54] VARIABLE TIMING CIRCUIT FOR CARD READERS AND THE LIKE

[75] Inventor: Eric E. E. Vanderheyden, Hummelstown, Pa.

[73] Assignee: AMP Incorporated, Harrisburg, Pa.

[21] Appl. No.: 818,776

[22] Filed: Jul. 25, 1977

[51] Int. Cl.² .................. G06K 7/10; G06K 9/00; G11B 5/09; G11B 15/12
[52] U.S. Cl. .................. 235/466; 340/146.3 AG; 360/42; 360/62
[58] Field of Search .................. 360/42, 62; 235/462, 235/466, 475; 340/146.3 Z, 146.3 AG, 149 A, 152 R; 250/568

[56] References Cited

U.S. PATENT DOCUMENTS

| | | | |
|---|---|---|---|
| 3,599,151 | 8/1971 | Harr | 340/146.3 AG |
| 3,727,202 | 4/1973 | Fort | 360/42 |
| 3,748,442 | 7/1973 | Lovendusky | 235/475 |
| 3,784,792 | 1/1974 | Dobras | 235/466 |
| 3,784,795 | 1/1974 | Tuhro | 235/462 |
| 3,836,753 | 9/1974 | Pass | 235/475 |
| 3,893,170 | 7/1975 | Kellner | 360/42 |
| 3,896,293 | 7/1975 | Pass | 235/475 |
| 3,909,594 | 9/1975 | Allais | 340/146.3 AG |
| 3,930,266 | 12/1975 | Okamoto | 360/62 |

OTHER PUBLICATIONS

F. C. Marino, "Digital Data: Play It Like It Is", The Electronic Engineer, pp. 74–78, Jun. 1969.

*Primary Examiner*—Robert M. Kilgore
*Attorney, Agent, or Firm*—Russell J. Egan

[57] ABSTRACT

A circuit is disclosed for use in magnetic card readers to compensate for variations in card speed as a card moves under a read head. The subject circuit decodes two frequency coherent phase encoding. This self clocking binary code incorporates the presence or absence of pulses (or transitions of voltage levels) within periodic intervals or bit cells as a representation of a logic 1 or a logic 0 respectively.

6 Claims, 3 Drawing Figures

VARIABLE TIMING CIRCUIT FOR CARD READERS AND THE LIKE

BACKGROUND OF THE INVENTION

1. The Field of the Invention

The present invention relates to card readers and in particular to a variable timing circuit which compensates for variations in speed of a card through the reader.

2. The Prior Art

The present invention is intended for use with a known card reader of the type manufactured by AMP Incorporated and identified as their magnetic card reader model 75. The read and write circuitry for this model card reader is disclosed in U.S. Pat. Ser. No. 692,411 now U.S. Pat. No. 4,053,936 filed June 3, 1976, the description of which is incorporated herein by reference.

The elements of this type of card reader are well known in the prior art and may be summarized as follows. A read head scans across an encoded portion of a magnetically coded card which is serially transported past the read head by a suitable transport mechanism. The read head includes an electromagnetic transducer which converts the magnetic coding into a useable signal which is supplied to a decoder circuit which is utilized to retrieve electronically stored information, to place in storage additional information, to provide a read out of information retrieved from storage.

Examples of known transport mechanisms for card readers can be found in U.S. Pat. Nos. 3,748,442; 3,836,753; and 3,896,293.

The card reader is designed to read plastic cards conforming with the fiscal magnetic and encoding format set forth by the American Banker's Association. Complete information concerning the cards is available in the American Banker's Association bank cards standards manual obtainable through 1120 Connecticut Avenue, N.W., Washington, D.C. 20036. The specifications generally can be summarized as being a plastic card 3.375 inches in width, 2.125 inches in height, 0.03 inches in thickness with a radius corner of 1.125 inches. The magnetic stripe on the card is a minimum of 0.25 inches in width and has a minimum length of 3.135 inches. The stripe of ferromagnetic material should be capable of producing 80 to 130% of the read head voltage output when written with a current 350 to 500% of a reference write head current. The reference is the NBS standard reference material 3200. The magnetic stripe is applied to the card at predetermined locations according to the system utilizing the card.

Even with the best of machines and the best of care, there can be many causes for variations of the speed of transport of a card through the reader. These variations have many causes, such as imperfect cards, worn transports, or voltage variations in those readers equipped with motors. Of course any variation in the speed of the card through the reader is a source of a potential erroneous reading of the information on the magnetic stripe.

SUMMARY OF THE INVENTION

The present invention pertains to a circuit which decodes the frequency coherent phase encoding specifically as it relates to magnetic card readers. A self clocking binary code incorporates the presence or absence of pulses (or transitions of voltage levels) within periodic intervals or bit cells as a representation of a logic 1 or a logic 0, respectively. The circuit includes a reference voltage generator, a sample and hold circuit, a variable timing circuit, and an output logic circuit.

It is therefore an object of the present invention to produce an improved circuit which will ascertain and compensate for any irregularity in the movement of a magnetically encoded card through a card reader.

It is a further object of the present invention to produce an improved variable timing circuit which can be readily and economically produced.

The means for accomplishing the foregoing objects and other advantages will become apparent to those skilled in the art from the following detailed description taken with reference to the accompanying drawings.

DETAILED DESCRIPTION OF THE PREFERRED EMBODIMENT

Figure 1:
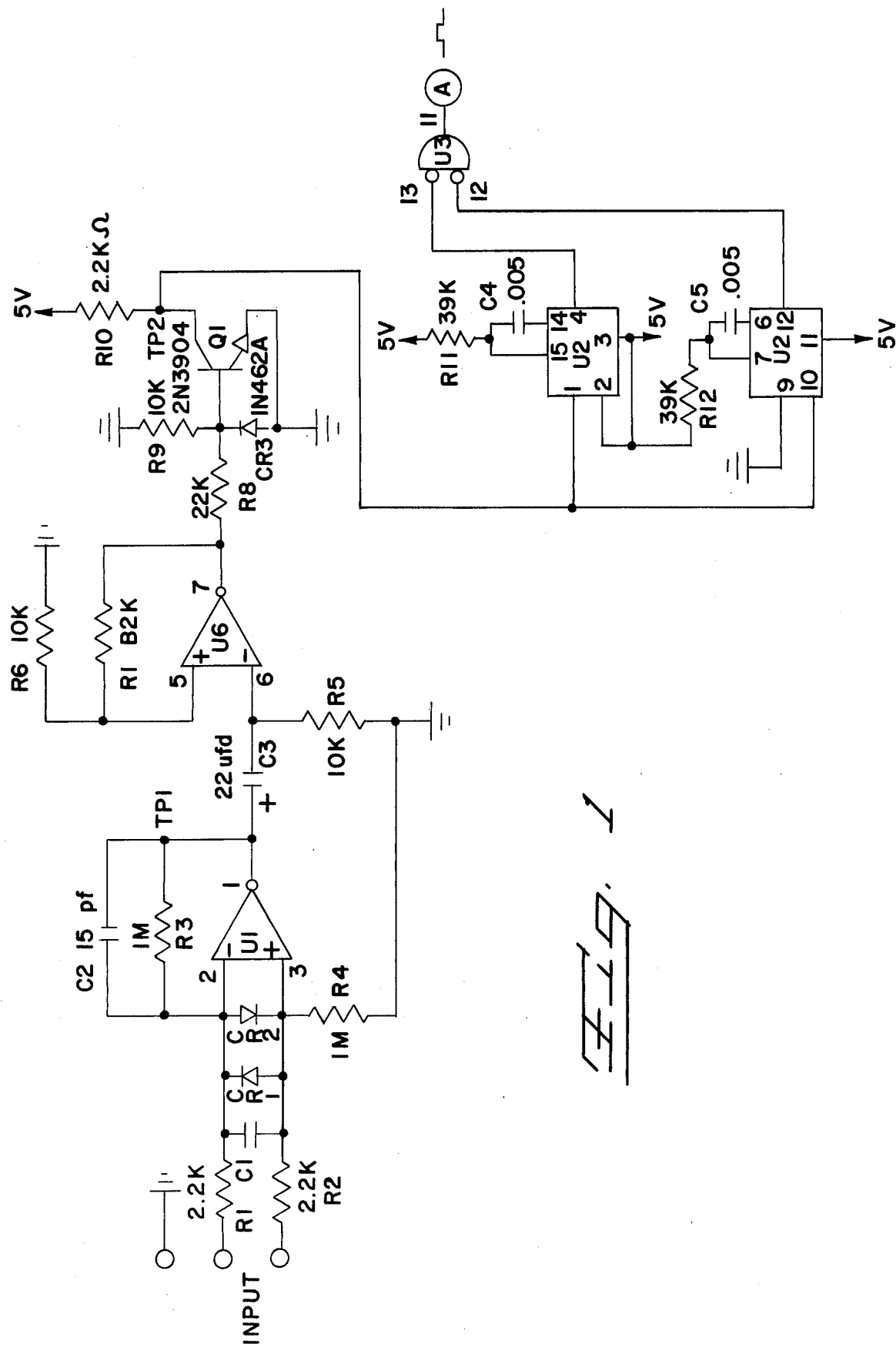
FIG. 1 is a schematic representation of a pulse train generator.
Figure 2A:
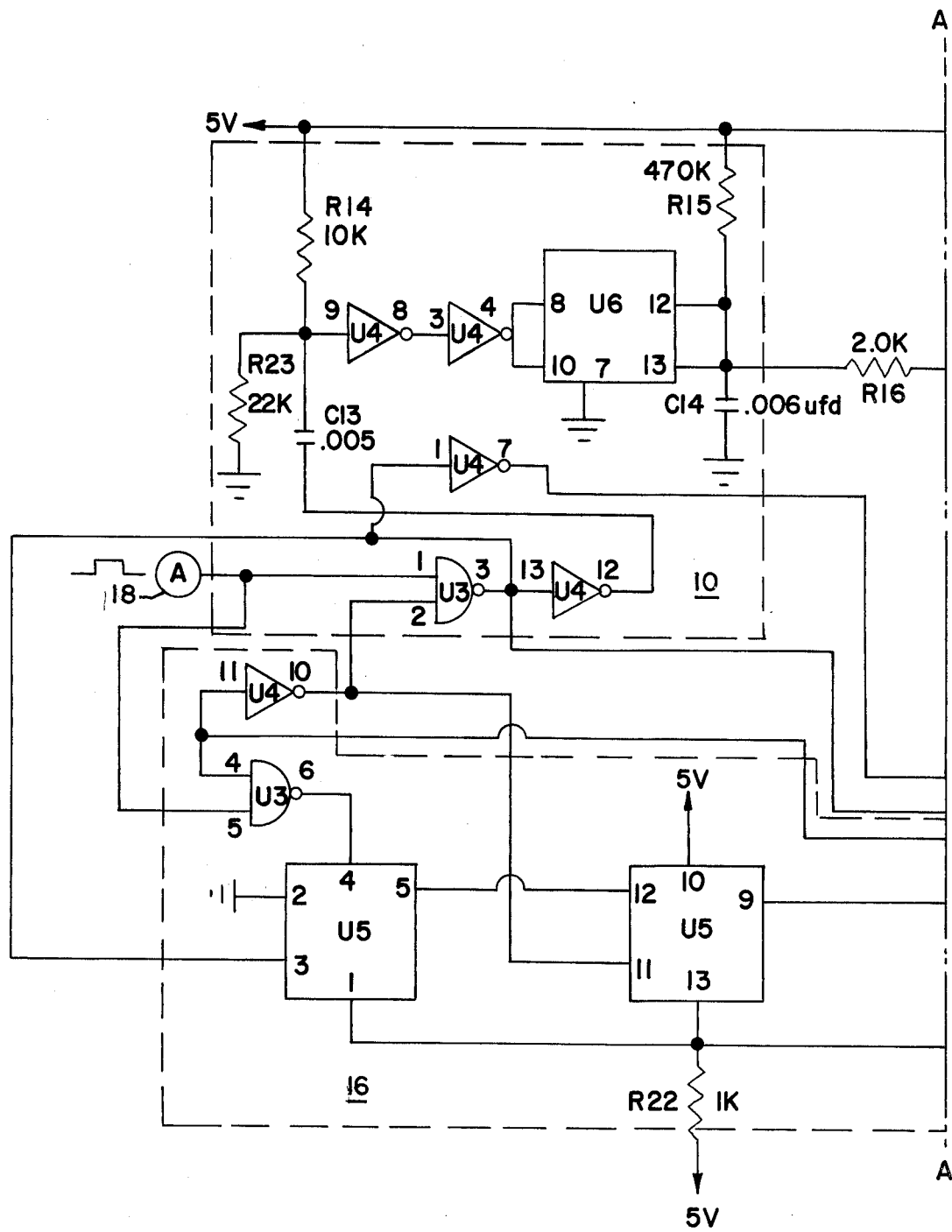
FIGS. 2A and 2B are a schematic representation of the subject variable timing circuit.
Figure 2B:
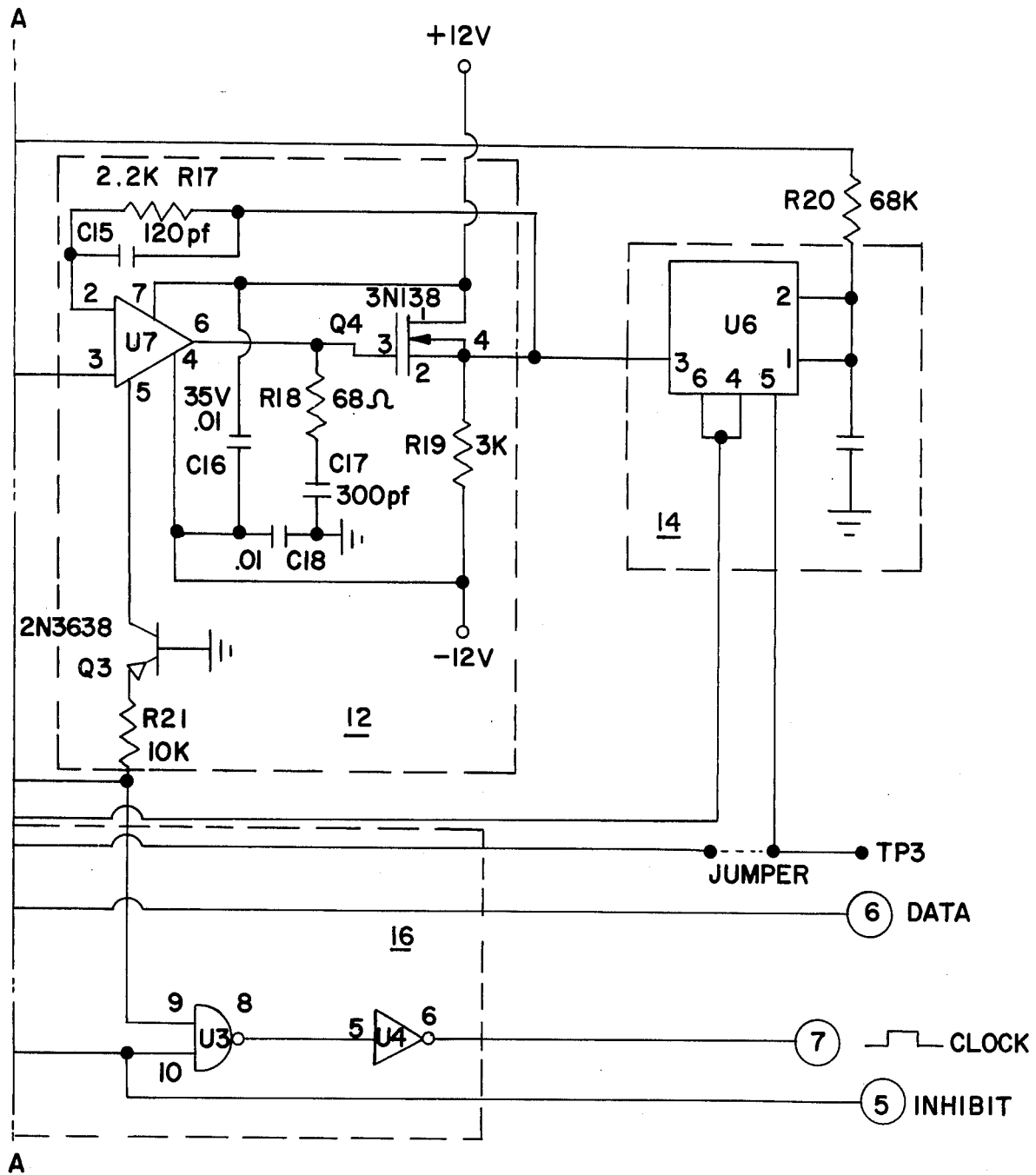

In the drawings U1 is an operational amplifier, U2 is a dual monostable, U3 is a NAND gate, U4 is an inverter, U5 is a flip-flop, U6 is a dual timer, and U7 is an operational amplifier.

The decoding circuit herein described makes provision for the variations and card speeds as it moves under a read head (not shown). These variations have many causes such as imperfect cards, worn transports, or voltage variations in those readers equipped with motors. Present circuitry does not take into account bit cell variations and transitions are detected by interrogating a memory element at approximately 0.75 times the nominal bit cell interval. When speed variations occur, bit cell time varies accordingly, however, the interrogation point remains at the 0.75 of the nominal bit cell time. This is a fixed time adjusted during manufacture. It can readily be seen that errors will occur as speed variations cause the bit cell time to approach either 150% or 75% of nominal bit cell time. This corresponds to a slow down and speed up of the card past the read head, respectively.

The circuit described herein overcomes this error mode by monitoring bit cell time and adjusting the interrogating point accordingly. It consists of four basic functional blocks, namely the reference voltage generator 10, the sample and hold circuit 12, the variable timing circuit 14, and the output logic circuit 16.

The input of this circuit consists of a TTL compatible pulse train at input 18. This pulse train is derived from flux transitions detected by the read head (not shown) and processed and transformed by U1, Q1, and U2 of the pulse train generator. The data, by convention, is formatted such that it is preceded by a number of 0's which are used to synchronize decoding equipment.

The reference voltage generator 10 of the subject variable timing circuit operates in response to an input train of pulses. The first data arrives at U3-1 and, since U3-2 is at this time positive, is inverted at U3-3 and again at U4-12. At this point the data is applied to C13 where the negative transition of the pulse is converted to a negative pulse of short duration at U6-8 and U6-10 (which are the trigger and reset inputs of a Signetics 556 timer). As a result C14 starts charging through R15 on the positive going edge. Charging continues until the next clock pulse appears at U6-8 and 10 at which time the capacitor is discharged and a new charging cycle is started. The charge on the capacitor is therefore a function of the time between subsequent input pulses at 18. It is this voltage level that becomes the basis for establishing the interrogating point for the next bit interval.

The sample and hold circuit 12 receives the output of the reference voltage generator. The reference voltage at C14 has to be sampled and stored to become the modulating force to the interrogation timer. Sampling is performed by Q3 and U7. The clock pulses at 18 are applied through U3 and U4 to R21 where they serve to apply a gating current to U7-5 through Q3. Gating occurs for the duration of the pulse at which time the operational amplifier turns on and samples the pulse on C14. The high input impedance of the operational amplifier limits the degradation of the charge on C14 during sampling and converts the signal to its output where it is used to charge the storage capacitor C17 to the next exact voltage as appearing on C14. After sampling this voltage is stored on C17 and applied to the gate Q4 which is an FET with very low gate leakage current. The output of Q4 (pin 2 and 4) has a low output impedance allowing it to modulate the control input (pin 3) to a Signetics 556 timer.

The variable timing circuit 14 is used to provide the time interval during which a transition is expected and is nominally adjusted to 0.75 times the bit cell interval. The control input (pin 3) of U6 establishes the voltage level to which the timing capacitor C19 has to charge before it reaches a threshold level and discharges. The control voltage is proportional to the preceding clock pulse interval and the second timer tracks this voltage accordingly. The 75% interval therefore varies along with the data rate even though the latter may vary.

Data is represented in the output logic circuit 16 as a sequence of 0's and 1's accompanied by a clock or strobe pulse indicating when data is valid. The data is stored and processed through two flip-flops (U5) and a couple of NAND gates and inverters. The clock pulses at input 18 initiate a timing interval during which U6-5 goes positive. Should a subsequent pulse be received during this time it is interpreted as a one and strobed. This occurs at U3-6 which goes to 0 and presets U5-5 to a 1. The following edge of this interval at U6-5 is inverted at U4-10 into a rising edge which cocks the input at U5-12 to the input of U5-9. The next pulse is interpreted as a clock pulse and clocks out the data. The sequence is repeated until all the data has been processed.

The present invention may be subject to many modifications and changes without departing from the spirit or essential characteristics thereof. The present embodiment is therefore to be considered in all respects as illustrative and not restrictive of the scope of the invention.

What is claimed is:

1. In a card reader, a variable timing circuit compensating for variations in the speed of a card travelling past a read head, said variable timing circuit comprising:
    a reference voltage generator responsive to an input train of pulses to charge a capacitor to a voltage level serving as an interrogating point for the next bit interval;
    a sample and hold circuit receiving an output of said reference voltage generator which output is sampled and stored upon gating of said sample and hold circuit;
    a timing circuit nominally adjusted to a portion of the expected bit cell interval and receiving an output of the sample and hold circuit causing the time interval to vary with the sampled data rate; and
    an output logic circuit receiving data input and passing it when accompanied with a strobe pulse from said variable timing circuit.

2. The variable timing circuit according to claim 1 wherein said reference voltage generator comprises:
    a NAND gate,
    an invertor; and
    a timer connected in series for converting said input train of pulses to pulses of short duration, charging of said capacitor therefor being a function to the time between said input pulses.

3. The variable timing circuit according to claim 1 wherein said sample and hold circuit comprises:
    an operational amplifier connected to receive an output from said reference voltage generator;
    means to apply a gating current to said amplifier;
    capacitive means for charging to a level corresponding to said output from said reference voltage generator; and
    means to apply the stored voltage across said capacitive means to said timing circuit.

4. The variable timing circuit according to claim 1 wherein said timing circuit comprises:
    a dual timer having a first portion preset to a percentage of the expected bit cell interval and a second which tracks the control voltage from the sample and hold circuit, which voltage is proportional to the preceding clock pulse.

5. The variable timing circuit according to claim 1 wherein said output logic circuit comprises:
    a NAND gate,
    an inverter, and
    a flip-flop connected to pass data when accompanied by a strobe pulse from said timing circuit.

6. A method for compensating for variations in the speed of travel of a card moving through a card reader comprising the steps of:
    generating a train of pulses;
    charging a first capacitor to a voltage level serving as an interrogating point for the next bit interval;
    gating an operational amplifier and sampling the voltage level of said first capacitor;
    applying said voltage to a control input of a timer, preset to a percentage of the expected bit cell interval.

* * * * *